E. A. PALMER.
RESILIENT WHEEL.
APPLICATION FILED DEC. 5, 1912.
1,133,882.
Patented Mar. 30, 1915.
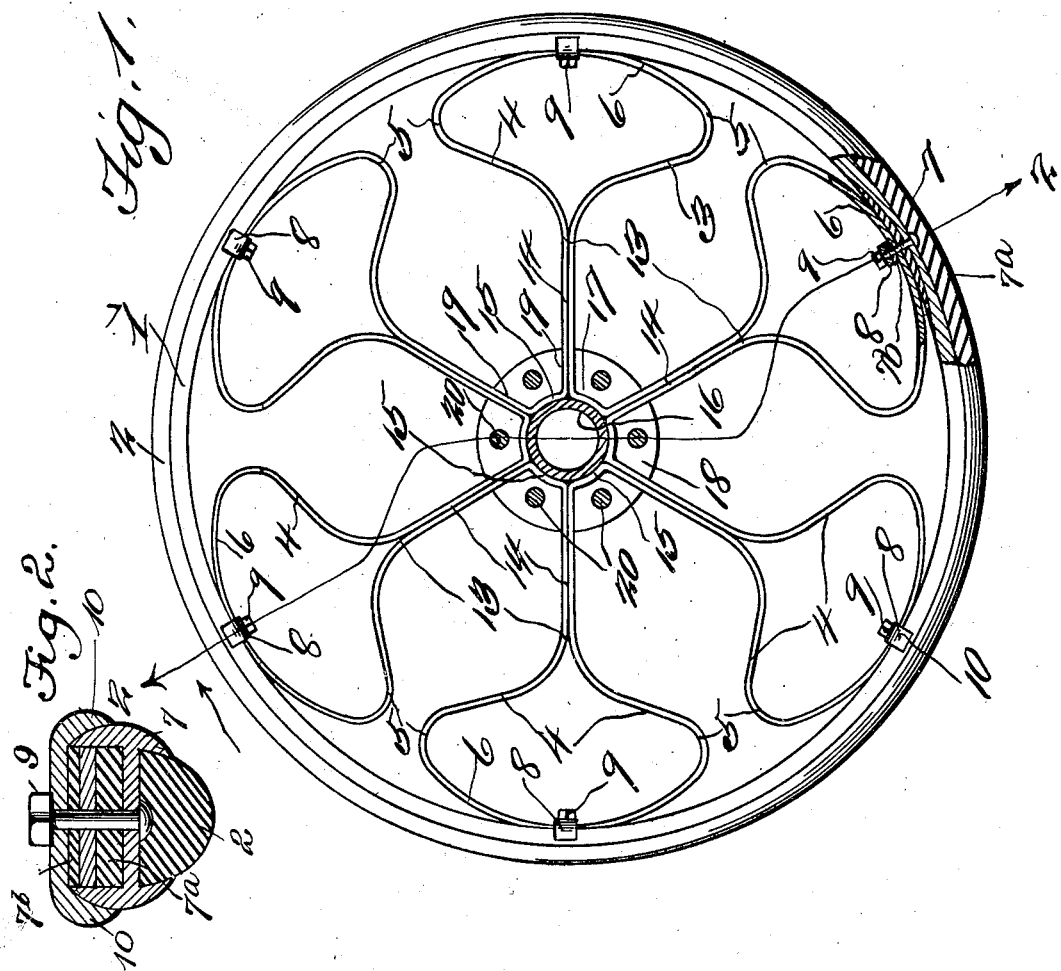

UNITED STATES PATENT OFFICE.

EUGENE A. PALMER, OF BELLE PLAINE, IOWA.

RESILIENT WHEEL.

1,133,882. Specification of Letters Patent. Patented Mar. 30, 1915.

Application filed December 5, 1912. Serial No. 735,166.

*To all whom it may concern:*

Be it known that I, EUGENE A. PALMER, a citizen of the United States, residing at Belle Plaine, in the county of Benton and State of Iowa, have invented a new and useful Resilient Wheel; and I do hereby declare the following to be a full, clear, and exact description of the invention, such as will enable others skilled in the art to which it appertains to make and use the same.

This invention relates to a new and useful resident wheel.

One of the features of the invention is the provision of a series of spokes constructed of a continuous strip of spring steel sheet metal. This strip of spring steel sheet metal is constructed to form a series of substantially elliptical loops, the ends of which are offset from the rim of the wheel, so that the arches of the loops may freely yield, in order to insure the resiliency of the wheel.

Another feature of the invention is the provision of novel means for holding the inner portions of the sheet steel strip in place.

There are disclosed in the drawing certain features of construction, but in practical fields these features may necessitate alterations, to which the patentee is entitled, provided the alterations fall within the scope of what is claimed.

The invention comprises further features and combination of parts, as hereinafter set forth, shown in the drawings and claimed.

In the drawings:—Figure 1 is a view in side elevation and partly in section of the improved resilient wheel, showing the construction of the rim adjacent the substantially elliptical loops. Fig. 2 is a transverse sectional view through that portion of the structure of Fig. 1 which is shown broken away and in section.

Referring to the drawings 1 designates the rim of the wheel, which is channeled out to receive any form of tire, whether it be a hard rubber, leather or pneumatic tire 2, it being immaterial as to what character of tire and rim is used.

A strip of resilient spring sheet steel 3 is provided, which is constructed into a series of substantially elliptical shaped loops 4, the end portions 5 of which are offset or spaced from the rim, in order that the arches 6 of the substantially elliptical loops may freely yield. These arches 6 are partly seated in recesses of the rim 1, which recesses are designated by the numeral 7. Bolts or other means pass through the rim, the arches and plates 8, and are provided with nuts 9 for securing the parts together. The plates are provided with lugs 10 which engage the opposite edge portions of the rim, and assist in holding the arches in place. The recesses 7 assist in guiding the arches 6 in their movements when depressed. The portions of the resilient steel strip beyond the loops toward the center of the wheel are brought together as at 13 for substantially half the radius of the wheel, to form the spokes 14. Each portion 13 of each spoke is connected integrally by the portion 15 to the succeeding portion 13 of the next spoke. In this manner it will be seen that the spokes and the loops are constructed of a continuous strip of sheet spring steel. The portions 15 are constructed concentric with the bushing 16 of the hub of the wheel, and engaged therewith, as shown in Fig. 1. Fitting the bushing 16 of the hub on each end thereof is a sleeve 17 having an integral collar 18. These collars 18 of the sleeve are provided with radial recesses 19 to receive the spokes 14, so as to hold the portions 13 of said spokes clamped together securely. Passing through the collars 18 are bolts or other suitable means 20 having nuts 21, whereby the structure of the hub is held together securely.

Arranged in the recesses 7 are filler blocks, constructed of fiber or any other suitable material designated by the numeral 7ª, for the purpose not only of cushioning the parts of the wheel at such points, but also to render the wheel noiseless. In other words, to prevent rattling and the like. Arranged between the arched portion 6 of the loops and the plates 8 are fiber fillers 7ᵇ, which likewise cushion the parts of the wheel, as well as rendering the wheel noiseless. The recesses or pockets 7 extend just slightly beyond where the arched portions 6 of the loop engage the fiber filler 7ª, that is, when the wheel is not in action, so that when the wheel is in action, the arched portions 6 of the loop will always engage the fiber. It will also be noted that the fiber filler blocks 7ª are slightly recessed to receive the arched portions 6 of the loops.

The invention having been set forth, what is claimed as new and useful is:—

In combination, a hub member, spokes extending therefrom and having substantially elliptical shaped loops at their outer portions, a rim having a series of elongated pockets gradually merging into the surface of the rim, fiber filler blocks in said pockets and terminating slightly beyond where the arches of said loops normally engage, the sides of said pockets acting to prevent twisting of the filler blocks. said filler block having recesses to receive the arches of the loops to prevent their twisting, clamping plates for holding the arches in place, fiber fillers between the plates and the arches, and means for clamping the rim, the first filler block, the archer portions of the loops, the second fillers and the plates together.

In testimony whereof I have signed my name to this specification in the presence of two subscribing witnesses.

EUGENE A. PALMER.

Witnesses:
 DEAN SWIFT,
 A. J. OLMSTED.